(12) United States Patent
Garver

(10) Patent No.: US 11,815,121 B2
(45) Date of Patent: *Nov. 14, 2023

(54) SHORTENED FASTENER WITH LOCALLY CONTROLLED THREAD HEIGHT

(71) Applicant: MATHREAD INC., Wixom, MI (US)

(72) Inventor: Michael Garver, Glen Arbor, MI (US)

(73) Assignee: MATHREAD, INC., Wixom, MI (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/151,290

(22) Filed: Jan. 18, 2021

(65) Prior Publication Data

US 2021/0140463 A1    May 13, 2021

Related U.S. Application Data

(62) Division of application No. 16/245,856, filed on Jan. 11, 2019, now Pat. No. 10,927,877.

(51) Int. Cl.
*F16B 25/00* (2006.01)
*F16B 35/04* (2006.01)

(52) U.S. Cl.
CPC .................... *F16B 35/047* (2013.01)

(58) Field of Classification Search
CPC ....................................... F16B 35/047
(Continued)

(56) References Cited

U.S. PATENT DOCUMENTS 2,021,704 A    11/1935  Thatcher ............. F16B 25/0021
4,915,560 A *   4/1990  Peterson ............... F16B 35/047
                                                     411/386

(Continued)

FOREIGN PATENT DOCUMENTS

CN    101208526 A    6/2008    ............. F16B 35/00
CN    204175729 U    2/2015    ............. B66B 11/02
(Continued)

OTHER PUBLICATIONS

International Search Report and Written Opinion, Application No. PCT/US2019/0066147, 9 pages, dated Apr. 3, 2020.
(Continued)

*Primary Examiner* — Gary W Estremsky
(74) *Attorney, Agent, or Firm* — Slayden Grubert Beard PLLC

(57) ABSTRACT

A male anti-cross threading fastener comprising: a substantially round shank having a lead end, a torque end, and a plurality of male threads around a circumference of the shank, the plurality of male threads comprising: a standard thread around at least a portion of the circumference of the shank and having a standard thread contour, wherein a width and a thread angle of the standard thread enables engagement with corresponding female threads, wherein the major diameter of the standard thread is between a lower major diameter limit and a higher major diameter limit; a transitional thread around at least a portion of the circumference of the shank and having a transitional thread contour with a width and a thread angle similar to the width and thread angle of the standard thread that enables engagement with corresponding female threads; an anti-cross thread around at least a portion of the circumference of the shank and having an anti-cross thread contour and an outside diameter configured to promote alignment of the male anti-cross thread fastener with a female fastener; and a lead thread around at least a portion of the circumference of the shank and having a lead thread contour, and wherein the transitional thread contour has a height that transitions from the lower major diameter limit of the standard thread to the outside diameter of the anti-cross thread.

6 Claims, 9 Drawing Sheets

(58) Field of Classification Search
USPC .................................................. 411/386, 411
See application file for complete search history.

(56) References Cited

U.S. PATENT DOCUMENTS

| | | | | |
|---|---|---|---|---|
| 5,234,301 | A | 8/1993 | Grossberndt | 411/386 |
| 5,791,849 | A | 8/1998 | Goodwin et al. | 411/386 |
| 5,836,731 | A | 11/1998 | Goodwin et al. | 411/386 |
| 5,836,761 | A * | 11/1998 | Belvedere | A63B 71/085 |
| | | | | 128/861 |
| 6,062,786 | A * | 5/2000 | Garver | F16B 35/047 |
| | | | | 411/386 |
| 6,135,892 | A * | 10/2000 | Donovan | F16B 35/047 |
| | | | | 470/10 |
| 6,155,761 | A * | 12/2000 | Donovan | B21H 3/06 |
| | | | | 411/386 |
| 6,536,314 | B1 * | 3/2003 | Forster | B23D 35/001 |
| | | | | 82/84 |
| 6,561,741 | B2 | 5/2003 | Garver | 411/386 |
| 6,685,411 | B2 * | 2/2004 | Kato | F16B 35/047 |
| | | | | 411/386 |
| 7,866,930 | B2 | 1/2011 | Murase et al. | 411/386 |
| 8,348,572 | B2 | 1/2013 | Friederich | 411/387.4 |
| 9,644,664 | B2 | 5/2017 | Garver | |
| 10,690,170 | B2 | 6/2020 | Pritchard | |
| 2002/0076302 | A1 * | 6/2002 | Garver | F16B 35/047 |
| | | | | 411/386 |
| 2003/0059275 | A1 | 3/2003 | Mizuno | 411/386 |
| 2006/0245842 | A1 | 11/2006 | Raub et al. | 411/378 |
| 2008/0159826 | A1 * | 7/2008 | Dietz | F16B 35/044 |
| | | | | 411/386 |
| 2010/0040432 | A1 * | 2/2010 | Totsu | F16B 39/282 |
| | | | | 411/386 |
| 2011/0200410 | A1 * | 8/2011 | Konagaya | F16B 35/047 |
| | | | | 411/412 |
| 2014/0044499 | A1 * | 2/2014 | Torii | F16B 25/0021 |
| | | | | 411/386 |
| 2016/0281761 | A1 | 9/2016 | Garver | F16B 33/02 |
| 2016/0281762 | A1 | 9/2016 | Garver | F16B 33/02 |
| 2016/0281763 | A1 | 9/2016 | Garver | F16B 33/02 |
| 2018/0355904 | A1 * | 12/2018 | Kageyama | B21H 3/02 |

FOREIGN PATENT DOCUMENTS

| | | | | |
|---|---|---|---|---|
| CN | 106471265 A | 3/2017 | | F16B 35/04 |
| JP | 11509915 A | 8/1999 | | F16B 33/02 |
| JP | 2000329125 A | 11/2000 | | F16B 33/02 |
| JP | 2018189244 A | 11/2018 | | F16B 35/00 |

OTHER PUBLICATIONS

Chinese Office Action, Application No. 201980084094.6, 17 pages, dated May 24, 2022.
Japanese Office Action, Application No. 2021540173, 10 pages, dated Jul. 4, 2022.
Brazilian Office Action, Application No. 1120210135871, 6 pages, dated Apr. 25, 2023.
Japanese Office Action, Application No. 2022155075, 8 pages, dated Jul. 31, 2023.

* cited by examiner

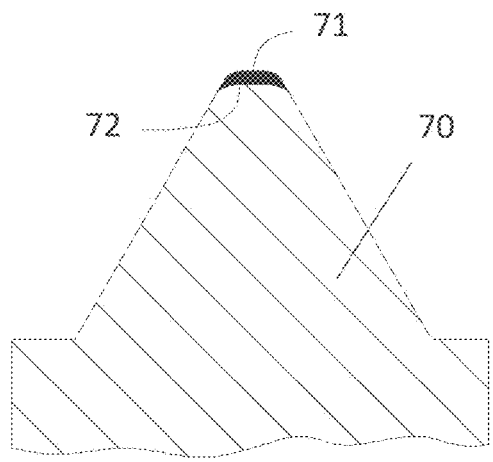
FIGURE 6
(PRIOR ART)
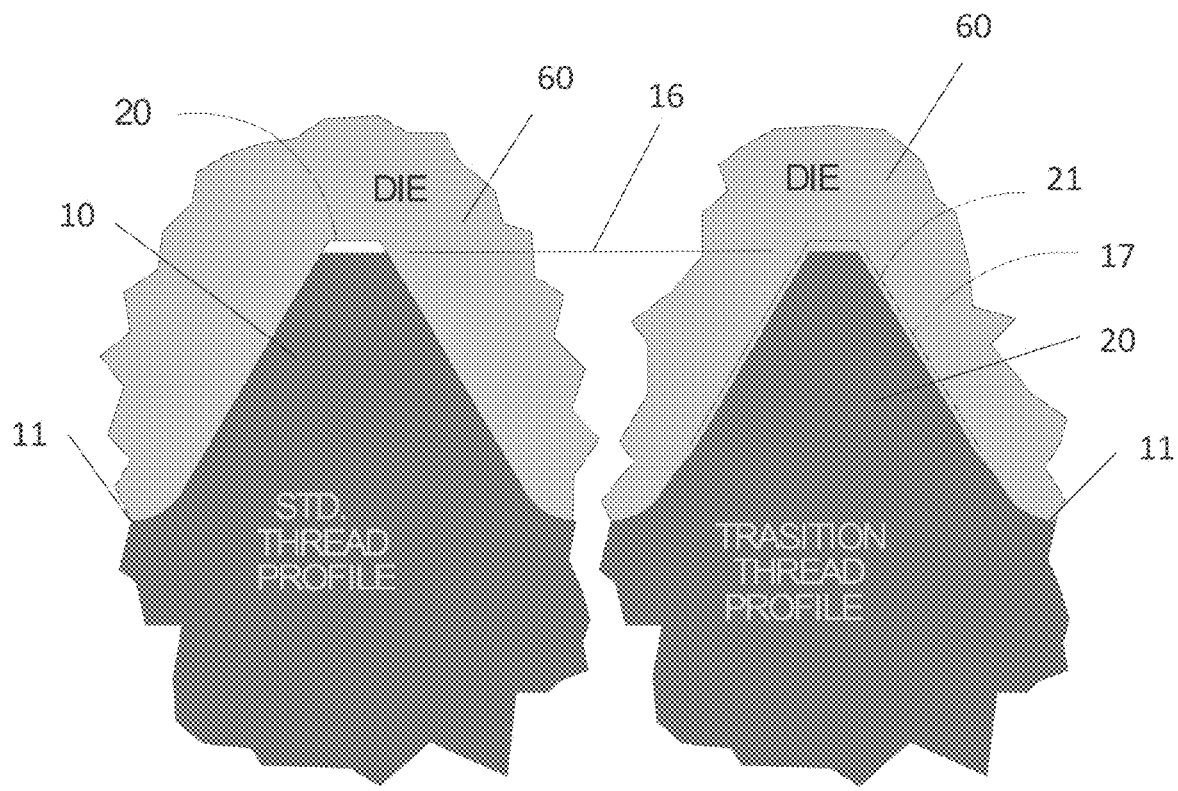
FIGURE 7A
(PRIOR ART)
FIGURE 7B
(PRIOR ART)

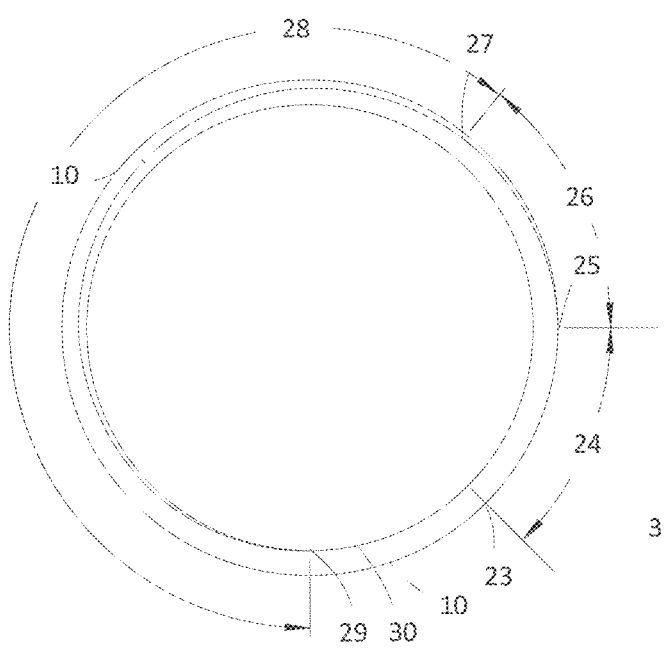
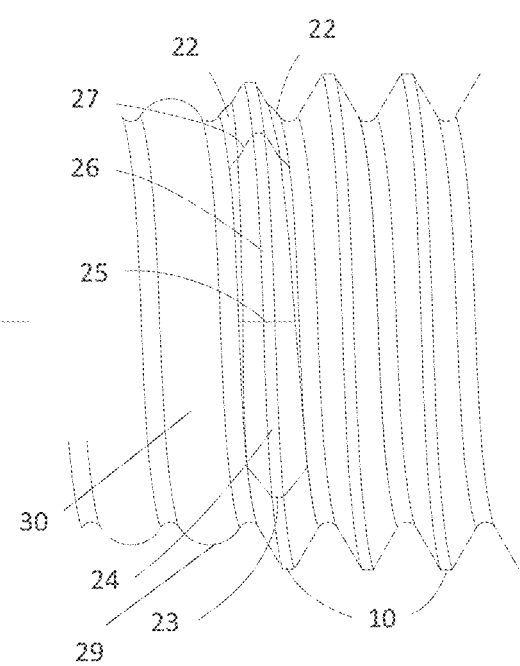
FIGURE 8A
(PRIOR ART)
FIGURE 8B
(PRIOR ART)

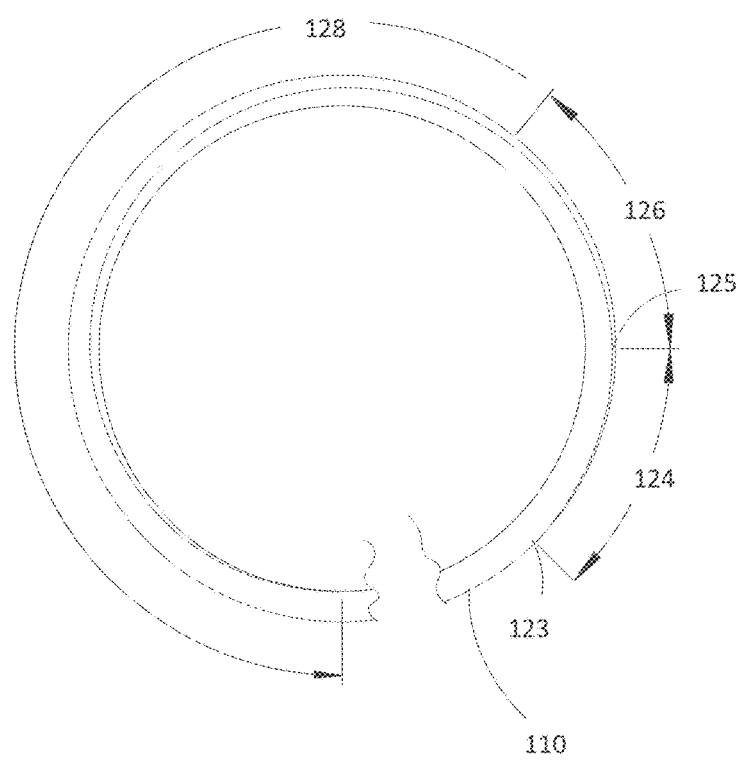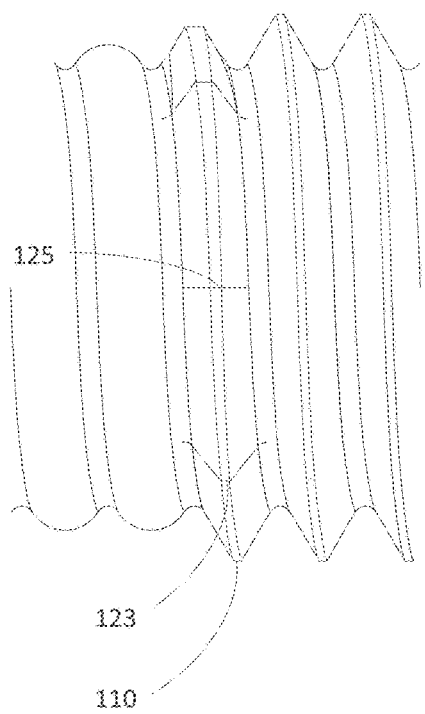
FIGURE 12A
FIGURE 12B

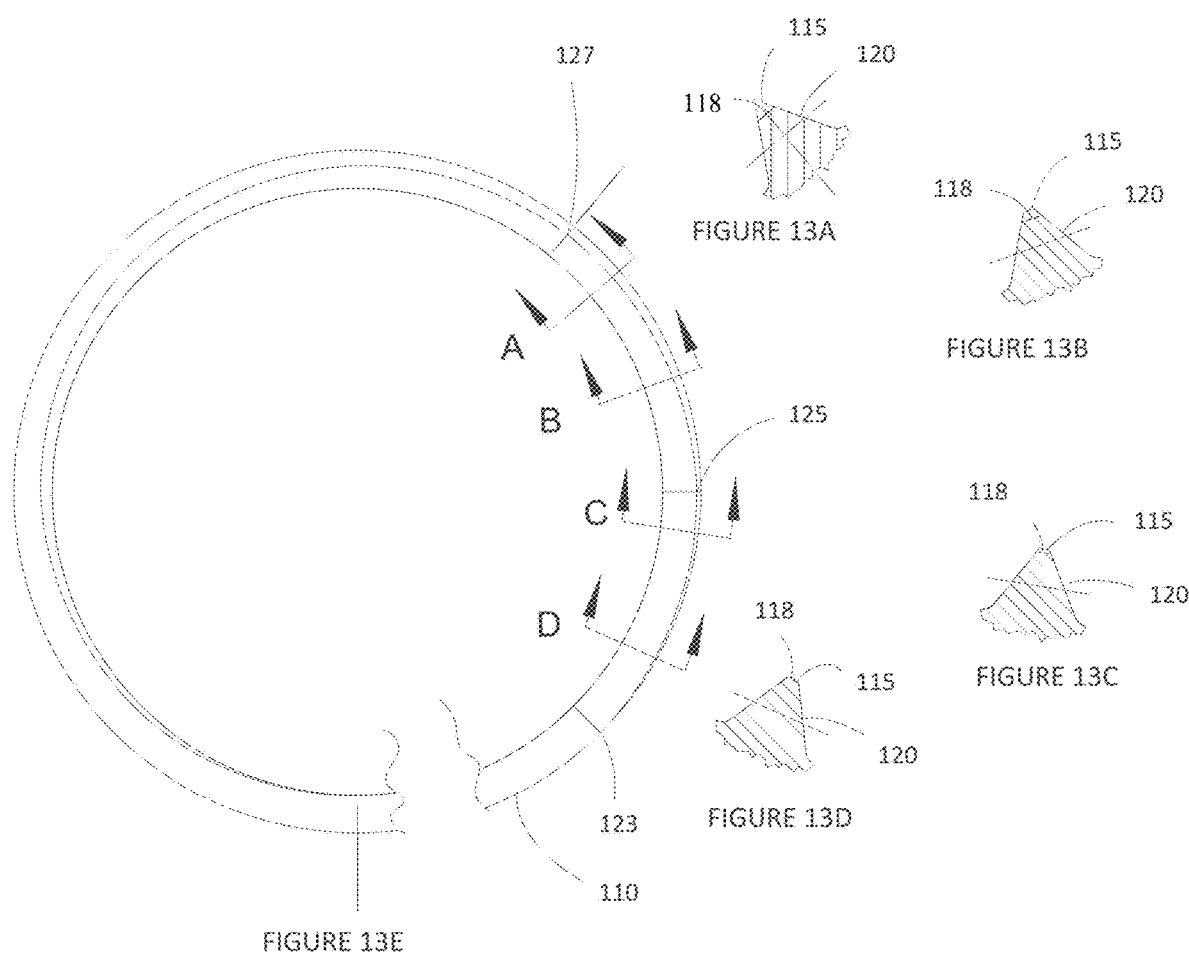

SHORTENED FASTENER WITH LOCALLY CONTROLLED THREAD HEIGHT

CROSS-REFERENCE TO RELATED APPLICATIONS

This application is a divisional of U.S. application Ser. No. 16/245,856 filed on Jan. 11, 2019, which is incorporated herein in its entirety.

TECHNICAL FIELD

The present disclosure relates in general to the field of threaded fasteners such as screws and bolts and, more particularly, a transition thread at the lead end of the thread helix.

BACKGROUND

U.S. Pat. No. 5,836,731 discloses an anti-cross thread fastener, incorporated in its entirety herein. FIG. 1 shows a side view of a known anti-cross thread fastener, wherein the thread helix is different from most fastener threads in that the helix comprises four sequential contours, rather than a standard thread contour for the entire length of the helix. These four thread contours include (listed in order from the fastener head to the lead end): (i) a standard, ISO-type thread contour 10 wraps around the shank of the fastener for the majority of helix turns, such number of turns determined as required to achieve a desired functional thread length; (ii) a transition thread contour 20 is adjacent the standard thread contour; (iii) an anti-cross thread contour 30 has a radial profile, as describe in U.S. Pat. No. 5,836,731, and a length of approximately one complete turn of the helix; and (iv) a lead thread contour 40 having a length from one eighth turn to several turns of the helix and functions to lead the thread helix into its mating with a female thread. U.S. Pat. No. 9,644,664, incorporated herein in its entirety, describes a contour for the lead thread 40 that lends improved anti-false-thread performance to the fastener. U.S. Pat. No. 6,561,741, incorporated herein in its entirety, describes a contour for the lead thread 40 that lends improved lead in performance to align the fastener. The lead thread contour 40 may also have other less ideal profiles. Anti-cross thread and anti-false-thread fasteners are commonly sold under the tradenames MAThread® and MATpoint®.

The transitional thread contour 20 has two primary functions: (i) to form a smoothly blended transition between the standard ISO-type thread contour 10 and the anti-cross thread contour 30; and (ii) to not interfere with or create undue contact with the female thread during threading. Both of these functions are non-structural and do not require a full height, standard thread.

To perform the first function, the transitional thread contour 20 has one end that smoothly blends with the standard ISO-type thread contour 10 and the other end that smoothly blends with the radial profile of the anti-cross thread contour 30. The height of the anti-cross thread contour 30 is approximately half the height of the standard ISO-type thread contour 10. The transitional thread contour 20 must provide a smooth transition between these thread heights.

To perform the second function, the transitional thread contour 20 decreases in height over its length. FIG. 2 shows a cross-sectional view of two adjacent threads of a fastener taken along the longitudinal central axis of a fastener shank 14. The threads have standard parts. For example, the standard ISO-type thread contour 10 has troughs 11, flanks 12, and a crest 13, wherein the thread angle of the flanks 12 is approximately sixty degrees. The flanks 12 are flat and extend from the troughs 11 to the crest 13. The standard ISO-type thread contour 10 is the tallest thread having a standard thread major diameter 16. The anti-cross thread contour 30 is approximately half as tall having an anti-cross thread outside diameter 36, so that there is a difference in height 62. The transitional thread contour 20 should transition, without interfering with female threads of a female fastener as they engage with the lead thread contour 40 and the anti-cross thread contour 30.

FIGS. 3A-3H provide a series of sequential cross-sectional views taken through the transition thread contour 20 as it wraps around the fastener shank 14. A straight line 61 extends across the tops of the transition thread contour 20 in these figures to illustrate a constant reduction in the height as the thread helix wraps around the shank 14. The transitional thread contour 20 is a blend or merge of the ISO-type standard thread contour 10 (see FIG. 3A) and the anti-cross thread profile 30 (see FIG. 3H). As a standard portion 21 of the transitional thread contour 20 decreases in height, more and more of an anti-cross portion 22 protrudes to form the flanks 12 at the troughs 11. The transition thread contour 20 first appears as a slightly shorter standard thread profile (see FIG. 3B), wherein the flanks 12 are at the same angles and width of the crest 13 is the same as the standard ISO-type standard thread contour 11. The difference being the profile is shifted down so the thread is shorter and the width between the troughs 11 is narrower. In FIG. 3D, a standard portion 21 of the thread is shifted even further down so the transitional thread contour 20 is even shorter. Also, with the standard portion 21 shifted down, an anti-cross portion 22 bulges to from the flanks adjacent the troughs 11. In FIG. 3E, the standard portion 21 is shifted still further down so the transitional thread contour 20 is even shorter and the anti-cross portion 22 forms even more of the flanks 12 adjacent the troughs 11. In FIG. 3F, the anti-cross portion 22 dominates with the standard portion 21 forming a tip at the top of the transitional thread contour 20. In FIG. 3F, the transition thread contour 20 is similar to that shown in FIG. 3G, except the tip of the standard portion 21 protruding at the top of the anti-cross portion 22 is even shorter and narrower. Importantly, as shown in FIGS. 3B-3G, the crest 13 at the top of the standard portion 21 maintains the same width, and the flanks 12 of the standard portion 21 maintain the same flank angles.

FIGS. 4A-4H provide a series of sequential cross-sectional views taken through another known transitional thread contour 20 as it wraps around a fastener shank 14. Rather than shifting the standard portion 21 down, this transitional thread contour 20 widens the flank angles of the flanks 12 of the standard portion 21. The transitional thread contour 20 first appears as a slightly shorter standard thread profile (see FIG. 4B), wherein width of the crest 13 is the same as the standard ISO-type standard thread contour 11, but the flanks 12 are angled slightly wider so as to extend all the way to the troughs 11. In FIGS. 4C-4E, the transitional thread contour 20 is shortened by maintaining the width of the crest 13 the same and angling the flanks 12 wider to extend to the troughs 11. In FIG. 4F, the height of the transitional thread contour 20 continues to be shortened so that the anti-cross portion 22 bulges to form the flanks at the troughs 11 and the flanks 12 of the standard portion 21 are widened to blend into the contour of the anti-cross portion 22. In FIG. 4G, the anti-cross portion 22 dominates with just a small hump having a crest 13 at the top and very wide flanks 12 blending into the contour of the anti-cross portion 22.

The transitional thread contours 20 known to accomplish this transition have varied between the superimposed contours illustrated in FIGS. 3B-3G and the more smoothly blended contours shown in FIGS. 4B-4G. Any shape between these contours is adequate to accomplish the transition function.

The second function of the transitional thread contour, i.e., not interfering with the female thread during use, may be satisfied with a thread height that is never so high, anywhere along its length, that it might interfere with, and/or jam, against the internal female thread of a female fastener during the camming action of the male anti-cross thread fastener. A height decrease at an essentially linear rate as it progresses around the helix from the full thread height to the anti-cross thread has been satisfactory. For example, an M8×1.25 6 g metric transitional thread has been used with a constant height reduction rate of approximately 0.0015 mm per degree of helix rotation. In FIGS. 3A-3H and 4A-4H, straight line 61 extends across the tops of the transition thread contour 20 to illustrate a constant reduction in the height as the thread helix wraps around the shank 14. Transition thread contours 20 having lengths from one-quarter turn (90 degrees) to one and one-quarter turns (450 degrees) have been utilized.

SUMMARY

Therefore a need exists for improved anti-cross thread fastener.

According to aspects of the invention, there is provided a male anti-cross threading fastener comprising: a substantially round shank having a lead end, a torque end, and a plurality of male threads around a circumference of the shank, the plurality of male threads comprising: a standard thread around at least a portion of the circumference of the shank and having a standard thread contour, wherein a width and a thread angle of the standard thread enables engagement with corresponding female threads, wherein the major diameter of the standard thread is between a lower major diameter limit and a higher major diameter limit; a transitional thread around at least a portion of the circumference of the shank and having a transitional thread contour with a width and a thread angle similar to the width and thread angle of the standard thread that enables engagement with corresponding female threads; an anti-cross thread around at least a portion of the circumference of the shank and having an anti-cross thread contour and an outside diameter configured to promote alignment of the male anti-cross thread fastener with a female fastener; and a lead thread around at least a portion of the circumference of the shank and having a lead thread contour, and wherein the transitional thread contour has a height that transitions from the lower major diameter limit of the standard thread to the outside diameter of the anti-cross thread.

Another aspect of the invention provides a male anti-cross threading fastener comprising: a substantially round shank having a lead end, a torque end, and a plurality of male threads around a circumference of the shank, the plurality of male threads comprising: a standard thread around at least a portion of the circumference of the shank and having a standard thread contour defined by troughs, a flat crest, and flat flanks from the troughs to the crest and a thread angle of about sixty degrees, wherein the major diameter of the standard thread is between a lower major diameter limit and a higher major diameter limit; a transitional thread forming a continuous helix with the standard thread around at least a portion of the circumference of the shank and comprising a transitional thread contour defined by troughs, a flat crest, and flat flanks from the troughs to the crest and a thread angle of about sixty degrees; an anti-cross thread forming a continuous helix with the transitional thread around at least a portion of the circumference of the shank and having an anti-cross thread contour and an outside diameter configured to promote alignment of the male anti-cross thread fastener with a female fastener; and a lead thread forming a continuous helix with the anti-cross thread around at least a portion of the circumference of the shank and having a lead thread contour, wherein the crest of the transitional thread contour widens and the height of the transitional thread contour shortens as the transitional thread contour transitions from the standard thread contour to the anti-cross thread contour.

According to still another aspect of the invention, there is provided a male anti-cross threading fastener comprising: a substantially round shank having a lead end, a torque end, and a plurality of male threads around a circumference of the shank, the plurality of male threads comprising: a standard thread around at least a portion of the circumference of the shank and having a standard thread contour defined by troughs at a minimum diameter, a flat crest at a major diameter, and flat flanks from the troughs to the crest having a width at a pitch diameter and a thread angle of about sixty degrees, wherein the major diameter of the standard thread is between a lower major diameter limit and a higher major diameter limit; a transitional thread forming a continuous helix with the standard thread around at least a portion of the circumference of the shank and comprising a transitional thread contour defined by troughs, a flat crest, and flat flanks from the troughs to the crest and a thread angle of about sixty degrees and a height no higher than the lower major diameter limit of the standard thread contour, wherein the wherein the transitional thread winds less than about five-eighths of a turn (225 degrees) around the shank; and an anti-cross thread forming a continuous helix with the transitional thread around at least a portion of the circumference of the shank and having an anti-cross thread contour comprising an outside diameter approximately the same as the pitch diameter of the standard thread, and wherein the anti-cross thread contour comprises a shape defined by a curve extending from a curve at a trough to about the outer diameter.

BRIEF DESCRIPTION OF THE DRAWINGS

A more complete understanding of the present disclosure may be acquired by referring to the following description taken in conjunction with the accompanying drawings wherein:

FIG. 6 shows a cross-sectional side view of a cutter tool for cutting thread rolling groove in a thread rolling die;

FIG. 7A is a cross-sectional side view of an ISO-type standard thread contour being rolled in a groove of a thread rolling die;

FIG. 7B is a cross-sectional side view of a transitional thread contour being rolled in a groove of a thread rolling die;

FIGS. 8A and 8B show end and side views, respectively, of a conventional male anti-cross thread fastener having a long transitional thread;

FIGS. 12A and 12B show end and side views of a male anti-cross thread fastener of the present invention;

FIGS. 13A through 13D are cross-sectional side views of the transitional thread taken at the sections indicated in FIG. 13E; and FIG. 13E is an end view of male fastener cut-off at a transitional thread contour.

Figure 1:
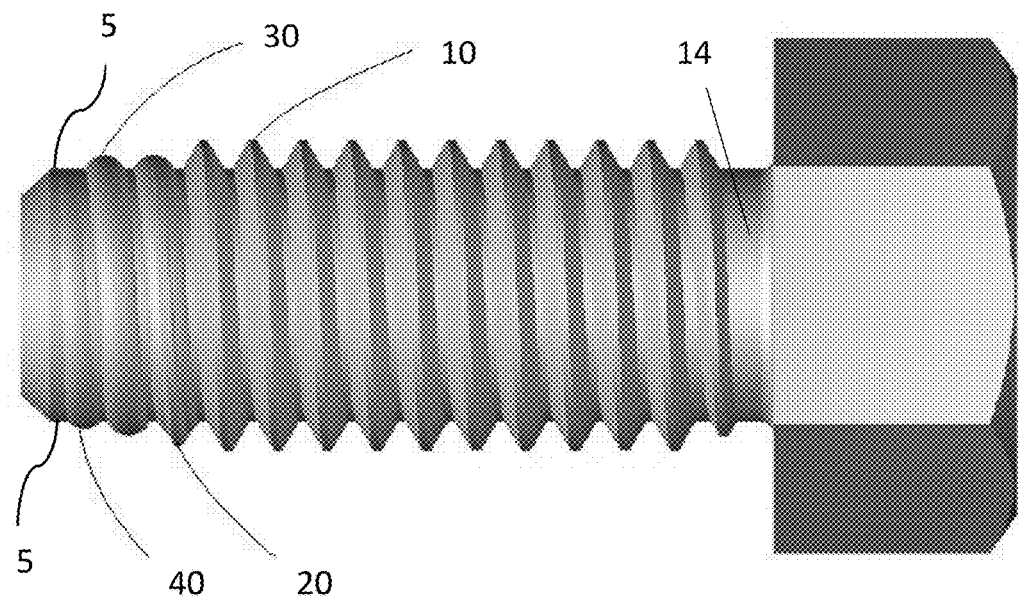
FIG. 1 illustrates a side view of a male anti-cross thread fastener known in the prior art.
Figure 2:
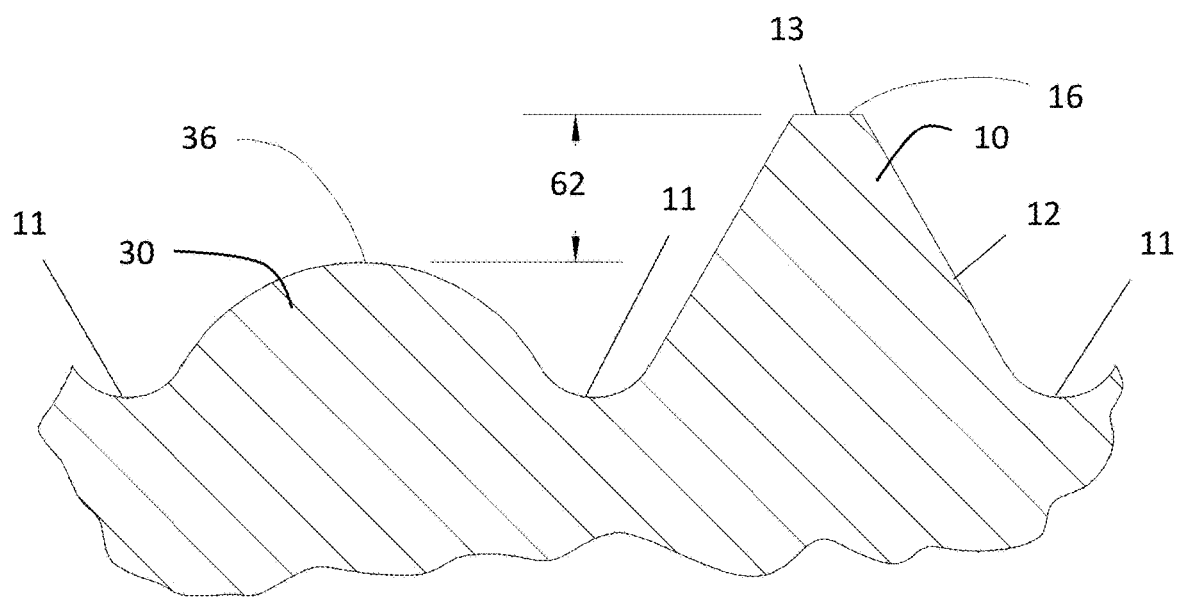
FIG. 2 illustrates a cross-sectional side view of a standard thread and an anti-cross thread of the male anti-cross thread fastener shown in FIG. 1.
Figures 3A, 3B, 3C, 3D, 3E, 3F, 3G, 3H:
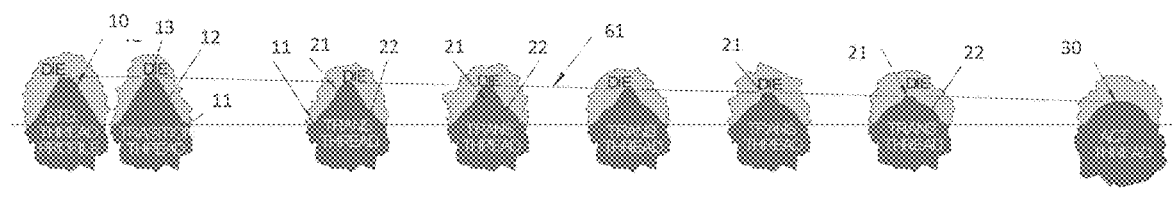
FIGS. 3A-3H provide a series of sequential cross-sectional views taken through a transition thread contour as it wraps around the fastener shank from the standard thread to the anti-cross thread.
Figures 4A, 4B, 4C, 4D, 4E, 4F, 4G, 4H:
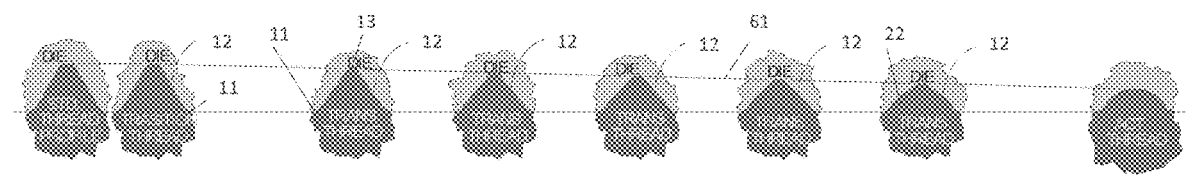
FIGS. 4A-4H provide a series of sequential cross-sectional views taken through a transition thread contour as it wraps around the fastener shank from the standard thread to the anti-cross thread.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to the teachings of this disclosure, shorter fasteners are possible while maintaining thread engagement and anti-cross thread functionality.

Aspects of the invention addresses what was previously a "fixed" length of the transitional thread contour of the thread helix on an anti-cross threading fastener. Aspects of the invention include a method of reducing the length of the transitional thread contour of the thread helix on an anti-cross threading fastener, while maintaining full anti-cross thread functionality.

The length of the transitional thread contour was previously considered "fixed" because the height transition can ideally be achieved in a calculated length of travel around the thread helix. In practice, the length of the transitional thread contour is longer than the calculated ideal because it is not possible to achieve that ideal length using today's production and manufacturing methods. This anomaly is due to two current circumstances: 1) the use of a thread rolling die itself must have its own build tolerances, and 2) the use of a process that must allow for thread height tolerances.

Because of these limitations, the groove in the thread rolling die that is actually utilized to form the transitional thread contour on the thread helix must be longer and deeper than that necessary to form a helical ramp of the desired length on the fastener. This extra groove length in the die requires extra "space" in the die, space that is wasted because it is not utilized to accomplish the necessary height change of the transitional thread contour that the die rolls during thread-rolling. In essence the longer linear transition in the die than actually desired, therefore, results in a longer helical transition formed on the fastener helix.

The anti-cross thread fastener thread-rolling die may be formed by utilizing a standard thread-milling cutter and cutting a series of linear grooves across the surface of the thread rolling die. When each individual cutter reaches a specified point, its cutting surface is withdrawn from the workpiece (die) at a constant rate as the cutter continues to progress in a straight path across the die surface. The groove thusly cut on the die surface is linear, at a constant depth for a finite length, then angles up and out of the die. The angle thusly formed at the bottom of the groove by the withdrawing cutter matches the growth rate desired for the transitional thread contour to be formed in the fastener thread helix that the die will roll. The growth rate of the transitional thread contour is shown as line 61 drawn across the tops of the thread sections illustrated in FIGS. 3A-3H and 4A-4H. The ideal linear angle at the bottom of the die groove produces a transitional thread contour of about three-quarter turn (270 degrees) of the helix in length when rolled on the fastener.

The angled portion of the grooves in the die that forms the transitional thread contour must, in fact, be longer and deeper than the calculated ideal length of the transitional thread contour because of tolerances of the thread rolling die itself and the thread height tolerances. With longer and deeper grooves in the die, the grooves are not completely filled with metal when forming the thread peak at their deepest point, and the grooves are narrower than the standard full thread for the entire length of the ramp in the die. These factors contribute to a transitional thread contour that does not have thread flanks at the same width and fullness a flanks of a standard thread. In particular, for the entire length of the ramp in the groove of the die, the transitional thread contour helix that is rolled on the fastener by that die contour is technically not able to engage the flanks of the standard female threads. Even though the desired height change may be accomplished in the desired three-quarter turn (270 degrees) of the helix, the transitional thread contour continues for some distance beyond that length as a full height thread, but with narrower flanks compared to a full standard thread. As such, since the primary purpose of the transitionary thread is to achieve the transition from ISO-type standard thread height down to anti-cross thread height, the transitional thread contour has some portion of its length that is not needed to achieve the change in height.

Referring now to the drawings, the details of example embodiments are schematically illustrated. Like elements in the drawings will be represented by like numbers.

Figure 5:
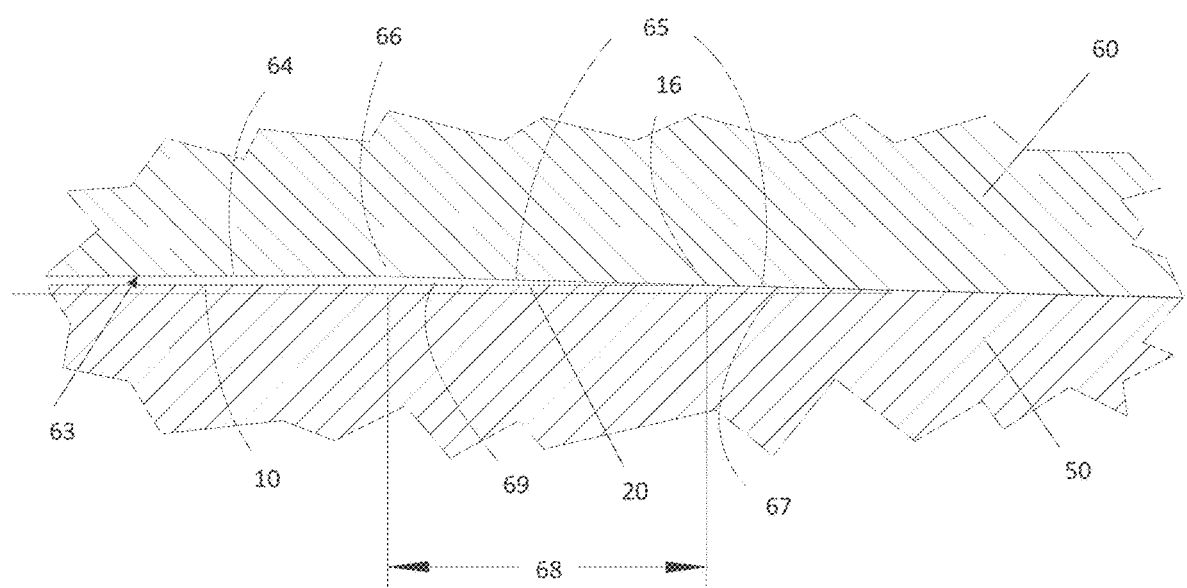
FIG. 5 illustrates a cross-sectional side view of a thread rolling die and an anti-cross thread fastener being rolled in the die.

FIG. 5 illustrates a cross-sectional side view of a thread rolling die 60 and an anti-cross thread fastener 50. The cross-section is taken down the center of a thread rolling groove 63 in the thread rolling die 60. To illustrate the match between the die 60 and the fastener thread helix it rolls, the anti-cross thread fastener 50 is shown with its thread helix "straightened" such that both the linear die groove and normally curved thread helix peak appear as a linear ramp, rather than a curved helix actually seen on the fastener rolled with that die. The thread rolling groove 63 has a constant depth section 64 and a ramp section 65. The thread rolling groove 63 transitions from the constant depth section 64 to the ramp section 65 at transition point 66, and the ramp section 65 terminates at terminal point (not shown) at its intersection with the anti-cross thread profile cut. The constant depth section 64 of the thread rolling groove 63 forms an ISO-type standard thread contour 10 in the anti-cross threading fastener 50. The ramp section 65 of the thread rolling groove 63 forms a transitional thread contour 20 in the anti-cross threading fastener 50. The length of the ramp section 65 extends well beyond the point where the fastener peak has achieved standard thread max height 16. This wasted length 68 of the thread rolling groove 63 is "wasted" because it does not fill with metal during rolling, leaving a gap 69. Therefore, the wasted length 68 accomplishes no purpose other than providing tolerance space for over-full threads to form.

FIG. 6 shows a cross-sectional side view of a cutter tool 70 for cutting thread rolling groove 63 in a die 60. In order for the cutter tool 70 to be used to cut the constant depth section 64 in the thread rolling groove 63 of the die 60 as shown in FIG. 5, it must have a longer point 71 compared to a cutter designed to cut a nominally shaped thread, which would have a shorter point 72. Further, when cutting tool 70 is progressively inserted to cut the ramp section 65, cutter tool 70 is too thin to cut a groove 63 in the die 60 wide enough to form a full-width ISO-type standard thread contour 10 until its cut reaches the maximum depth in the die when it cuts the constant depth section 64. As such, the entire ramp section 65 of the groove 63 is cut with a cutter 71 that is too narrow to form a full-width ISO-type standard thread contour 10.

FIG. 7A is a cross-sectional side view of an ISO-type standard thread contour 10 being rolled by a die 60. FIG. 7B is a cross-sectional side view of a transitional thread contour 20 being rolled by a die 60. For illustration, a standard thread profile 17 is superimposed on the die in FIG. 7B. Comparatively, the standard portion 21 of the transitional thread contour 20 formed in the transition area of the die 60 is narrower across the flanks than the standard thread profile 17. In effect, this means that a length of the die real estate reserved for the transition thread to grow to its peak height has been wasted by rolling a discrete part of the transition thread whose peak height 16 was actually within the allowable height range of the standard thread peak, but, because it is too narrow, does not function as full thread. There is, therefore, a length of the thread helix, rolled by the transition section of the die 60, between the actual ramp of the transitional thread contour and the point where the thread achieves full height and width that is there only because of the prior art means of manufacture. That transitionary die groove length is not necessary for transitional thread ramp-up, as the thread peak achieves the necessary height to meet a minimum height requirement of the standard thread in the first part of the groove, the last section of the transitionary groove forms only a transitional thread contour that is above the minimum necessary height and too narrow to be considered a full thread.

FIGS. 8A and 8B show end and side views, respectively, of a conventional male anti-cross thread fastener 50 having a long transitional thread contour 20. The ISO-type standard thread contour 10 of the helix is full width and height to a first change point 23 where the transitional thread contour 20 begins. The transitional thread contour 20 of the helix has a first section 24, between the first change point 23 and a second change point 25, where the profile of the thread has a height above the minimum required for a full standard thread but a width too narrow to function as a full standard thread. At second change point 25 the height of the transitional thread contour 20 is reduced to the mean standard thread height. In a second section 26 the helix profile is reduced in height, reaching the minimum standard thread height at point 27, but is still too narrow to function as a full standard thread. From the third change point 27, the transitional thread contour 20 begins to get shorter in height. Throughout a third section 28, the height and width of the transitional thread contour 20 is constantly reduced until it reaches forth change point 29. The fourth change point 29 marks the end of the transitional thread contour 20 and the beginning of the anti-cross thread contour 30. Notably, the anti-cross portion 22 of the anti-cross thread contour 30 demonstrates the transitional thread contour 20 is too thin to perform the function of a full standard thread over its entire length, including the first section 24. Prior to the present invention, anti-cross thread fasteners have had a transitional thread contour 20 of this length and have included a "too-narrow" first section 24 of the helix.

According to some embodiments of the invention, this "too-narrow" length of transitional thread contour 20 may be eliminated to produce a shorter anti-cross thread fastener. To provide the shortest possible full-functioning anti-cross thread fastener, i.e., the least costly, shortest, lightest, and most package-able, this "too-narrow" length of transitional thread contour 20 may be eliminated. Design of an anti-cross thread fastener according to the present invention may be predicated on providing a method, of limiting the transition thread length actually necessary to achieve the ramp-up to the minimum acceptable peak height, without the useless "too-narrow" section. Some embodiments of the invention include a novel contour for use on part of the helix of anti-cross thread fasteners that allows reducing the length of the transition thread, without negatively affecting thread functions.

Some embodiments of the invention provide a novel transition thread contour for an anti-cross threading fasteners, thus allowing extra, non-functional, helix length to be eliminated from that section of the thread helix. Such improvement may be gained by reconfiguring the first and second sections 24 and 26 of the transitional thread contour 20 of the helix shown in FIGS. 8A and 8B.

These two sections of transitionary helix are herein reconfigured by reforming each length of helix into a full standard-width thread contour. The full-width helix sections are to be provided with a novel, variable, yet more closely controlled, peak height. In particular, a peak height totally within the range of acceptable peak-height values of the standard thread. According to aspects of the invention, the peak-height values are deliberately reduced in a controlled manner, over the combined helix length of the two sections first and second sections 24 and 26, to the minimum acceptable standard thread profile height, at the second change point 25 where second section 26 blends into the beginning of the new, shorter transition thread.

By reconfiguring these sections of the helix, the thread effectively become a "standard thread" such that the combined length of the first and second sections 24 and 26 may be added to the existing standard thread helix, resulting in a longer standard-contour structural thread helix, with a shorter section of helix reserved for only transitionary function. This effectively allows a shorter fastener to accomplish the same function.

According to aspects of the invention utilized on the anti-cross thread fastened described herein may result in a transition thread length approximately one-quarter turns (90 degrees) shorter than a prior ideal thread, while maintaining the function(s) of the prior transition thread's rate of descent. Even tiny reductions in a fastener's non-structural helix length may provide large advantages in function of the fastener. Therefore, various aspects of the invention may provide a shorter, lighter, less-costly, more package able fastener, with improved anti-cross thread functionality.

Figure 9:
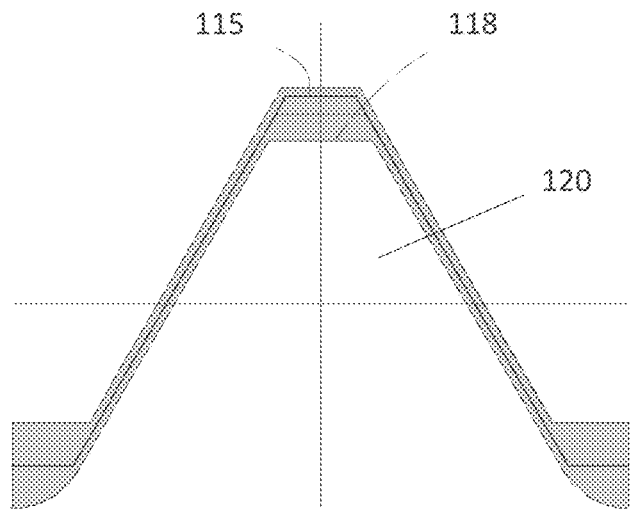
FIG. 9 illustrates a cross-sectional side view of a transitional thread contour of the present invention.

Referring to FIG. 9, a cross-sectional side view of a transitional thread contour 120 of the present invention is shown. The transitional thread contour 120 has a thread height 118 significantly shorter than the possible height of the standard thread major diameter 116. The standard thread major diameter 116 may be formed by completely filling the die in a mean position adequate to meet standard thread requirements. A transitional thread contour 120 having a relatively shorter thread height 118 maintains all the characteristics of the standard thread except for the height. Because the thread height 118 of the transitional thread contour 120 is more closely controlled, the thread does not need to be maintained within the same significant tolerance range, and may be shorter to bring the localized peak height down to a more valuable height, while maintaining its full width and flank angles to provide fastening characteristics. This relatively shorter thread height 118 may allow the transitional thread contour 120 of the helix to start at a lower height.

This very localized deliberate reduction in thread peak height, assuming it is only localized, with the remainder of the standard thread helix remaining at full height and full tolerance, still gives the manufacturer freedom to vary the standard thread peak height on all but this repurposed section of the transitionary thread, as may be required by that manufacturer's processes and/or customer requirements.

Figure 10:
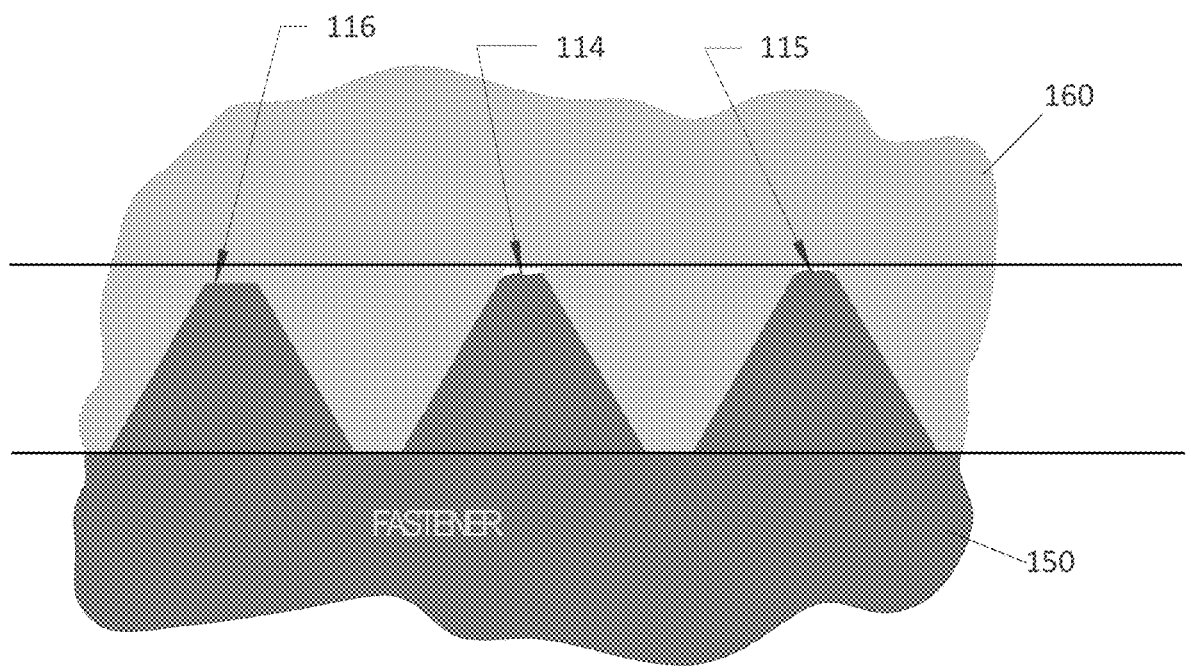
FIG. 10 shows a cross-sectional side view of three threads of a fastener being rolled in three adjacent grooves of a die to form a standard thread having a major diameter at a higher major diameter limit.

According to aspects of the invention, standard-type, anti-cross thread rolling dies may be provided with a reduced-depth section in the die groove that always preferentially fills completely. FIG. 10 is a cross-sectional side view of three threads of a fastener 150 being rolled in three adjacent grooves of a die 160 for forming a standard thread having a major diameter at a higher major diameter limit 115. In the first groove, the thread material of the fastener is pressed into a shorter, more restrictive groove to completely fill the groove to a thread profile having a more restricted, having a height at a lower major diameter limit 116. In the second groove, the thread material of the fastener is pressed into a full depth groove to partially fill the groove to a mean major diameter limit 114. In the third groove, the thread material of the fastener is pressed into a full depth groove to fill the groove to a higher major diameter limit 115 having a maximum allowable height. During the thread rolling process, the metal flow is restricted in a discrete section of the helix allowing the remaining full thread helix length to under-fill to varying degrees within its allowable height range, i.e., between the lower major diameter limit 116 and the higher major diameter limit 115, to meet the individual manufacturer's requirements for the full thread height of a standard thread having a major diameter, without in any way affecting the rolling process or function of the structural threads. Such preferential filling of the lower profile repurposed section may occur even when the adjacent full standard thread helix is manufactured with its peak at the lower major diameter limit 116.

Aspects of the invention provide a deliberate localized reduction in thread height in the area adjacent the transition thread may shorten the 'ramp' necessary to reach the peak of the anti-cross thread fastener to provide an effectively shorter transition thread and enabling reduced length anti-cross thread fasteners. A portion of the thread helix on a male anti-cross threading fastener of the type discussed above may be contoured to shorten the effective length of the anti-cross thread fastener's helix. The transition section of the helix, may not exceed one turn (360 degrees) of the thread helix in length, may begin at the end of the standard turns of the fastener helix at the point on the standard turns most distal from the fastener's head, and may end at the anti-cross thread.

A transitional thread contour according to aspects of the invention may be contoured so that its tallest point is blended with the full-height standard threads of the helix. From there, the transitional thread contour section of the helix may be reduced in height at a specified rate as it winds around the fastener shank to its shortest point. A transitional thread contour starts at the point where the nominal full height major diameter of the standard thread helix first decreases in height and blends through approximately one-quarter turn (90 degrees) of the helix to continue to reduce the height of the thread while maintaining flanks similar to a standard thread. During the reduction in peak-height, the transitional thread contour maintains a flank width and thread angle consistent with a standard thread profile, yet always be of a height approximately equal to the minimum acceptable for a full standard thread defined as the lower major diameter limit 116.

The full standard thread section of the helix may thereby gain a similar length of functionally equivalent thread and the transitional section of the helix may thereby be reduced in length by an equivalent amount. The male anti-cross threading fastener may have appropriate anticross threading features adjacent the leading end of the transition thread as well as an appropriate lead thread, and appropriate piloting features on the point of the fastener. An example of an appropriate piloting feature on the point of the fastener is the lead-in point 5 at the lead end of the shank 14, shown in FIG. 1. It is anticipated that this construction might also be utilized on other types of fasteners, as well as anti-cross threading fasteners that have a shorter, i.e., less ideal length transition thread, to improve their function.

Figures 11A, 11B:
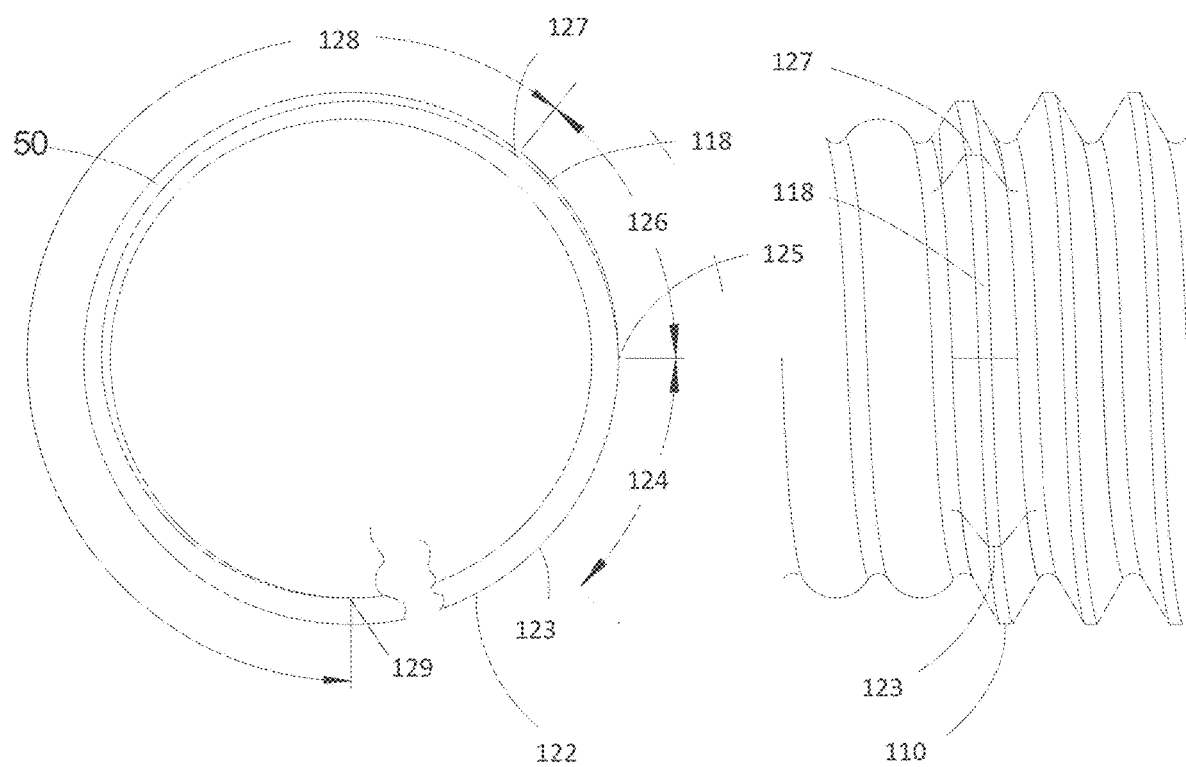
FIGS. 11A and 11B show end and side views of a male anti-cross thread fastener of the present invention.

Referring to FIGS. 11A and 11B, end and side views of a male anti-cross thread fastener of the present invention are shown. An ISO-type standard thread contour 110 of the helix has a full standard thread width and height to a first change point 123. At the first change point 123 the helix thread has a mean standard thread height and full standard thread flank width and thread angle of sixty degrees. (See 115 in FIG. 10). This flank width and peak height is maintained for the entire first section 124 to second change point 125. Over the second section 126 from the second change point 125 to a third change point 127, the helix profile is constantly reduced in height 118 at the preferred rate, to the mean major diameter limit 114 for standard-thread height (minimum acceptable) (see 114 in FIG. 10) at the third change point 127. Throughout the second section 126 the flank width of the flanks is maintained as that the standard fastener profile. As shown in FIG. 11B, the crest of the thread throughout the second section 126 grows wider from the second change point 125 to the third change point 127. Also shown in FIG. 11B, the flat flanks of the thread throughout the second section 126 are maintained at the troughs from the second change point 125 to the third change point 127.

With further reference to FIGS. 11A and 11B, a third section 128 extends from third change point 127 to the fourth change point 129. At the third change point 127, the thread contour is that of a standard thread 110 having been reduced to its minimum height and maintained standard flank width. The transitional thread contour 120 begins with this profile at the third change point 127 and transitions until it assumes the anti-cross thread profile at the fourth change point 129. The transition thread contour 120 may begin at the third change point 127 and ends at the fourth change point 129, such that it winds around the shank 14 for about five-eighths of a turn (225 degrees).

FIGS. 12A and 12B show end and side views of a male anti-cross thread fastener. In this embodiment, the fastener threads have a maximum material condition, meaning that the thread peaks are at their highest relative to the pitch line and the groove in the die that forms such peak would be completely full of material. A notable difference between this embodiment and the one illustrated in FIGS. 11A and 11B is that the full thread height is at a restricted, lower maximum permissible height (see 116 in FIG. 10) at the first change point 123 in the helix thread, rather than a higher standard thread height. (See 115 in FIG. 10). In a restricted, maximum material condition, the peak would be expected to flow to the maximum allowable height within the threading die groove. The thread peak is instead deliberately controlled to be shorter than the expected flow height, with this controlled height falling at the constant preferred rate to the mean height peak, while maintaining the full flank width. This difference in thread tolerance and manufacture results in constant growth of the transition helix section throughout the third section 128, rather than the constant height through the first section 124 (see FIG. 11A). This variation in height demonstrates the "free-flow" of metal to this height in a fastener utilizing the extreme major diameter.

As can be seen in comparing the drawings (FIGS. 11A-11B, and 12A-12B) the length of an effective full standard thread is increased by reconfiguring the first section 124 and a second section 126 to be full-width threads, while the overall length of the fastener helix is maintained.

FIG. 13E is an end view of male fastener cut-off at a transitional thread contour and FIGS. 13A through 13D are cross-sectional side views of the transitional thread taken at the sections indicated in FIG. 13E. The transitional thread contour 120 has a width as wide as the profile of the standard thread, while gradually reducing the height of the peak from the maximum allowable to the minimum allowable for a standard thread. As shown in FIGS. 13A-13D, the width of the transitional thread contour 120 remains constant and is as wide as the profile of the standard thread. As shown in FIG. 13D, the transitional thread contour 120 is at its height 118 as tall as the higher major diameter limit 115. See 115 in FIG. 10. As shown in FIG. 13C, the transitional thread contour 120 is shorter having a height 118 not quite as tall as the maximum allowable for the standard thread 115. As shown in FIG. 13B, the transitional thread contour 120 is shorter still having a height 118 not quite as short as the mean major diameter limit 114 for the standard thread. See 114 in FIG. 10. As shown in FIG. 13A, the transitional thread contour 120 has a height 118 approximately equal to the minimum acceptable for a full standard thread defined as the lower major diameter limit 116. See 116 in FIG. 10.

Because the transitional thread contour 120 has flanks the same width as the standard thread, the length of the ISO-type standard thread portion of the helix may be shortened. In particular, it may be shortened by the length of the transitional thread contour 120 from the first change point 123 to the third change point 127. This portion of the transitional thread contour 120 replaces a previously functionally unneeded section, allowing it to now be considered a standard thread, adding usable length to the standard thread helix. As such, the additional full thread may be utilized in fastened joint design, or, alternatively, the overall length, of the fastener may be reduced by shortening the standard thread by the amount of added low-profile standard thread, thus reducing weight, and cost.

The transitional thread contour 120 of the present invention may be manufactured as part of the thread helix of a male anti-cross thread fastener by deliberately providing a reduced diameter section of the fastener blank to the rolling die, causing a particular localized section of the thread rolling die to under-fill with metal during rolling, in order to allow free-flow of metal to achieve the desired shape. Alternatively, the transitional thread contour 120 may be machined to a lower height in some localize area of the helix. Either method may create a full-width, reduced-height section of the helix.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A male anti-cross threading fastener comprising:
    a substantially round shank having a lead end, a torque end, and a plurality of male threads around a circumference of the shank, the plurality of male threads comprising:
        a standard thread around at least a portion of the circumference of the shank and having a standard thread contour, wherein a width and a thread angle of the standard thread enables engagement with corresponding female threads, wherein the major diameter of the standard thread is between a lower major diameter limit and a higher major diameter limit, wherein the standard thread comprises a thread angle of about sixty degrees, wherein the standard thread winds at least two turns (720 degrees) around the shank;
        a transitional thread around at least a portion of the circumference of the shank and having a transitional thread contour with a width and a thread angle similar to the width and thread angle of the standard thread that enables engagement with corresponding female threads, wherein the transitional thread comprises a thread angle of about sixty degrees from troughs to crest, wherein the transitional thread winds less than about five-eighths of a turn (225 degrees) around the shank;
        an anti-cross thread around at least a portion of the circumference of the shank and having an anti-cross thread contour and an outside diameter configured to promote alignment of the male anti-cross thread fastener with a female fastener, wherein the anti-cross thread winds between one turn (360 degrees) and two turns (720 degrees) around the shank; and
        a lead thread around at least a portion of the circumference of the shank and having a lead thread contour, wherein the lead thread winds between one-half turn (180 degrees) and two turns (720 degrees) around the shank, and
        wherein the transitional thread contour has a height that transitions from the lower major diameter limit of the standard thread to the outside diameter of the anti-cross thread,
    wherein the transitional thread contour has a crest that widens as the height transitions from the lower major diameter limit of the standard thread to the outside diameter of the anti-cross thread.

2. The male anti-cross threading fastener of claim 1, wherein the standard thread, the transition thread, the anti-cross thread, and the lead thread comprise a continuous thread helix around the shank.

3. The male anti-cross threading fastener of claim 1, further comprising a lead-in piloting feature at the lead end of the shank.

4. A male anti-cross threading fastener comprising:
a substantially round shank having a lead end, a torque end, and a plurality of male threads around a circumference of the shank, the plurality of male threads comprising:
  a standard thread around at least a portion of the circumference of the shank and having a standard thread contour, wherein a width and a thread angle of the standard thread enables engagement with corresponding female threads, wherein the major diameter of the standard thread is between a lower major diameter limit and a higher major diameter limit, wherein the standard thread comprises a thread angle of about sixty degrees, wherein the standard thread winds at least two turns (720 degrees) around the shank;
  a transitional thread around at least a portion of the circumference of the shank and having a transitional thread contour with a width and a thread angle similar to the width and thread angle of the standard thread that enables engagement with corresponding female threads, wherein the transitional thread comprises a thread angle of about sixty degrees from troughs to crest, wherein the transitional thread winds less than about five-eighths of a turn (225 degrees) around the shank;
  an anti-cross thread around at least a portion of the circumference of the shank and having an anti-cross thread contour and an outside diameter configured to promote alignment of the male anti-cross thread fastener with a female fastener, wherein the anti-cross thread winds between one turn (360 degrees) and two turns (720 degrees) around the shank; and
  a lead thread around at least a portion of the circumference of the shank and having a lead thread contour, wherein the lead thread winds between one-half turn (180 degrees) and two turns (720 degrees) around the shank, and
wherein the transitional thread contour has a height that transitions from the lower major diameter limit of the standard thread to the outside diameter of the anti-cross thread,
wherein the outside diameter of the anti-cross thread is approximately the same as a pitch diameter of the standard thread, and wherein the anti-cross thread contour comprises a shape defined by a curve extending from a curve at the trough to about the outer diameter.

5. The male anti-cross threading fastener of claim 4, wherein the standard thread, the transition thread, the anti-cross thread, and the lead thread comprise a continuous thread helix around the shank.

6. The male anti-cross threading fastener of claim 4, further comprising a lead-in piloting feature at the lead end of the shank.

* * * * *